United States Patent
Srinivasan et al.

(10) Patent No.: US 12,377,757 B2
(45) Date of Patent: Aug. 5, 2025

(54) BUS SEAT WITH SELF-REINFORCED PEDESTAL

(71) Applicant: Indiana Mills & Manufacturing, Inc., Westfield, IN (US)

(72) Inventors: Shreyas Srinivasan, Fishers, IN (US); Darshan Racca, Carmel, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 326 days.

(21) Appl. No.: 17/934,383

(22) Filed: Sep. 22, 2022

(65) Prior Publication Data

US 2023/0100343 A1    Mar. 30, 2023

Related U.S. Application Data

(60) Provisional application No. 63/261,481, filed on Sep. 22, 2021.

(51) Int. Cl.
| | |
|---|---|
| *B60N 2/24* | (2006.01) |
| *B60N 2/015* | (2006.01) |
| *B60N 2/427* | (2006.01) |
| *B60N 2/68* | (2006.01) |
| *B64D 11/06* | (2006.01) |

(52) U.S. Cl.
CPC ............ *B60N 2/015* (2013.01); *B60N 2/242* (2013.01); *B60N 2/42709* (2013.01); *B60N 2/682* (2013.01); *B64D 11/0648* (2014.12)

(58) Field of Classification Search
CPC . B60N 2/242; B60N 2/42709; B64D 11/0648
See application file for complete search history.

(56) References Cited

U.S. PATENT DOCUMENTS

| | | | |
|---|---|---|---|
| 4,109,959 A | | 8/1978 | Barecki et al. |
| 4,440,441 A | * | 4/1984 | Marrujo ............. B60N 2/42709 |
| | | | 296/68.1 |
| 4,718,719 A | * | 1/1988 | Brennan ............ B64D 11/0696 |
| | | | 296/68.1 |

(Continued)

FOREIGN PATENT DOCUMENTS

| | | | | |
|---|---|---|---|---|
| CA | 2688683 A1 | * | 6/2011 | ............. B60N 2/242 |
| EP | 0495318 A1 | * | 7/1992 | |

(Continued)

*Primary Examiner* — Timothy J Brindley
(74) *Attorney, Agent, or Firm* — Woodard, Emhardt, Henry, Reeves & Wagner LLP

(57) ABSTRACT

A bench type seat frame for use in vehicles, such as busses and/or other passenger vehicles has been developed. In one example, the seat frame includes a reinforced pedestal mount. For example, the pedestal includes one or more self-reinforced feet mounted to a floor of the vehicle. In another example, the self-reinforced feet are made from folded steel in a double thickness configuration. The pedestal further includes one or more crumple zones configured to dissipate energy during a collision. In another example, the seat frame includes a cross member extending between the pedestal and a wall mount. In one example, the cross member is able to support both belted and unbelted seat configurations. For example, the cross member includes one or more belt anchors configured to receive and secure one or more seat belts.

17 Claims, 14 Drawing Sheets

(56) References Cited

U.S. PATENT DOCUMENTS

| | | | | |
|---|---|---|---|---|
| 4,861,103 A | * | 8/1989 | Vallee | B64D 25/04 |
| | | | | 297/445.1 |
| 5,531,404 A | * | 7/1996 | Marechal | B64D 25/04 |
| | | | | 296/68.1 |
| 5,743,592 A | * | 4/1998 | Bedouch | B64D 11/06 |
| | | | | 297/216.2 |
| 5,746,476 A | | 5/1998 | Novak et al. | |
| 5,826,945 A | * | 10/1998 | Siebler | B60N 2/242 |
| | | | | 297/484 |
| 8,123,293 B2 | | 2/2012 | Marriott et al. | |
| 9,010,863 B2 | | 4/2015 | Conley et al. | |
| 10,035,433 B2 | | 7/2018 | Muraiti et al. | |
| 2006/0290180 A1 | | 12/2006 | Belair et al. | |
| 2008/0143157 A1 | * | 6/2008 | Burch | B29C 44/1228 |
| | | | | 297/219.1 |
| 2012/0274115 A1 | | 11/2012 | Smith et al. | |
| 2021/0316638 A1 | * | 10/2021 | Naidenov | B60N 2/015 |
| 2022/0089062 A1 | * | 3/2022 | Kumar | B60N 2/245 |

FOREIGN PATENT DOCUMENTS

| | | | | | |
|---|---|---|---|---|---|
| EP | | 2556991 A1 | * | 2/2013 | B60N 2/062 |
| KR | | 20220072696 A | * | 6/2022 | |

* cited by examiner

BUS SEAT WITH SELF-REINFORCED PEDESTAL

CROSS REFERENCE TO RELATED APPLICATIONS

This application claims the benefit of U.S. Patent Application No. 63/261,481, filed Sep. 22, 2021, which is hereby incorporated by reference.

BACKGROUND

Vehicle seats, such as bench style seats in busses and/or other passenger vehicles, typically include a frame and/or mounting structure. As should be appreciated, the frame and/or mounting structure needs to have sufficient strength to provide safety to passengers in the event of a collision.

Thus, there is a need for improvement in this field.

SUMMARY

A unique seat frame has been developed for use in vehicle seats such as bench type seats commonly found in busses and passenger trains. The seat frame incorporates a unique pedestal design. Typically, pedestals for seats require stiffening plates when mounted to a floor of a vehicle. The pedestal in this design has a mounting bracket that is self-reinforced so as to provide the requisite stiffness when mounted to the floor. This self-reinforcement eliminates the need for the additional stiffening plates. In one example, the mounting bracket is made from folded steel to double the thickness of the mounting bracket. The pedestal is further designed to manage energy such as to dissipate energy during a crash. In one version, the pedestal includes one or more crumple zones that deform during the crash so as to dissipate the energy from the crash.

Opposite the pedestal, the seat frame has a wall mount that is configured to secure to a wall or other vertical structure of the vehicle. The wall mount is designed to be mounted in multiple different vehicle mounting configurations. For instance, the wall mount is adapted to secure the seat frame to a variety of vehicle body styles and/or in a variety of positions. To facilitate this, the wall mount has multiple mounting holes.

At the interface where the seat and seat back meet, the seat frame has a cross member that extends between the pedestal and the wall mount. At the ledge of the seat opposite the cross member, the seat frame has a cross beam extending between the pedestal and the wall mount. Together, the pedestal, wall mount, cross member, and cross beam, form a frame that supports the seat. The cross member is designed to support both belted type and unbelted type seats without significant modifications to the seat frame. In other words, this cross beam facilitates easy upgrades to incorporate seat belts. The cross member includes one or more anchor points in the form of belt anchors where the seat belts are secured. In one version, the cross beam includes a seat back flange that extends in generally the same direction as the seat back. The anchor points for the seat belts in this version are in the form of holes in the seat back flange where the belt anchors are bolted to the cross member. During a crash as well as other instances, the belt anchors for the seat belts can experience significant loads. In one form, the cross beam is made of ultra-strong steel that is roll formed into the general shape of the cross member. The cross member is held together through rivets. To avoid sharp edges from protruding toward the seat occupant, the rivet nuts of the rivets face away from the seat.

The system and techniques as described and illustrated herein concern a number of unique and inventive aspects. Some, but by no means all, of these unique aspects are summarized below.

Aspect 1 generally concerns a system that includes a vehicle seat.

Aspect 2 generally concerns the system of any previous aspect in which the vehicle seat frame.

Aspect 3 generally concerns the system of any previous aspect in which the vehicle seat frame includes a pedestal.

Aspect 4 generally concerns the system of any previous aspect in which the pedestal includes a mounting bracket configured to secure the pedestal to a floor of a vehicle.

Aspect 5 generally concerns the system of any previous aspect in which the pedestal mounting bracket is self-reinforced.

Aspect 6 generally concerns the system of any previous aspect in which the mounting bracket is made from a folded metallic material creating a double thick bracket configuration.

Aspect 7 generally concerns the system of any previous aspect in which the mounting bracket is directly mounted to the floor without an additional plate to increase joint stiffness.

Aspect 8 generally concerns the system of any previous aspect in which the pedestal is configured to assist in energy management.

Aspect 9 generally concerns the system of any previous aspect in which the pedestal includes one or more crumple zones to dissipate energy during a crash.

Aspect 10 generally concerns the system of any previous aspect in which the vehicle seat frame includes a wall mount configured to secure to a vehicle wall.

Aspect 11 generally concerns the system of any previous aspect in which the wall mount has two or more different vehicle mounting configurations.

Aspect 12 generally concerns the system of any previous aspect in which the wall mount has two or more mounting holes for securing the wall mount at the different mounting configurations.

Aspect 13 generally concerns the system of any previous aspect in which the vehicle seat frame includes a cross member.

Aspect 14 generally concerns the system of any previous aspect in which the cross member is configured to support both unbelted and belted type seats.

Aspect 15 generally concerns the system of any previous aspect in which the cross member has one or more belt anchors where one or more seat belts are anchored.

Aspect 16 generally concerns the system of any previous aspect in which the belt anchors mount to the cross member via fasteners arranged through one or more holes defined in a seat back flange extending from the cross member.

Aspect 17 generally concerns the system of any previous aspect in which the cross member is made of roll formed ultra-high strength steel.

Aspect 18 generally concerns the system of any previous aspect in which the cross member has one or more rivet nuts facing away from a seat occupant.

Aspect 19 generally concerns the system of any previous aspect in which the vehicle seat frame is configured to support a bench type seat.

Aspect 20 generally concerns the system of any previous aspect in which the bench type seat is a bus seat.

Aspect 21 generally concerns the system of any previous aspect in which the cross member includes one or more rivets.

Aspect 22 generally concerns the system of any previous aspect in which the mandrel of the rivets is oriented to face away from a seat occupant.

Aspect 23 generally concerns the system of any previous aspect in which the vehicle seat includes a seat bottom and a seat back.

Aspect 24 generally concerns the system of any previous aspect in which the pedestal includes a first leg and a second leg.

Aspect 25 generally concerns the system of any previous aspect in which the first leg and the second leg are connected via an arch of the pedestal.

Aspect 26 generally concerns the system of any previous aspect in which the crumple zones include a first crumple zone and a second crumple zone.

Aspect 27 generally concerns the system of any previous aspect in which the first crumple zone extends through the first leg, second leg, and arch of the pedestal.

Aspect 28 generally concerns the system of any previous aspect in which the second crumple zone extends through the arch of the pedestal.

Aspect 29 generally concerns a method of using or manufacturing the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
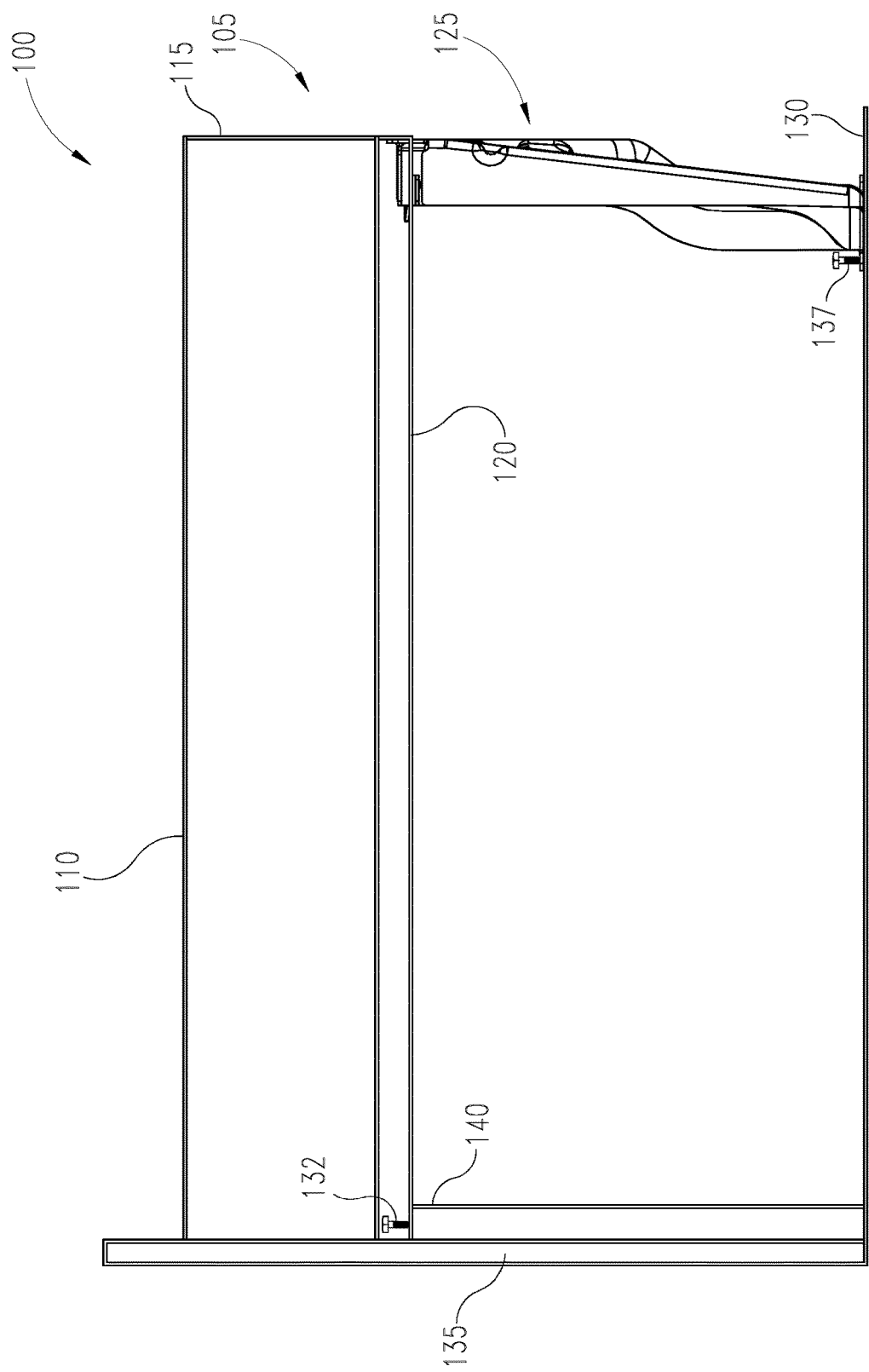
FIG. 1 is a diagrammatic view of a seating system of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a portion of a vehicle 100 including a seating system 105. The seating system 105 includes a seat 110 for seating passengers with a seat back 115 and a seat bottom 120. In one example, the seat 110 of the vehicle 100 includes a frame 125 configured to support the seat back 115 and seat bottom 120. In one example, the seat 110 is a bench type seat. In other examples, the seat is a bucket seat, captain seat, and/or other style of seat. In some examples, the seat 110 is mounted to a floor 130 of the vehicle 100 via one or more fasteners 132, such as screws and/or bolts, to secure the seat 110 within the vehicle 100. In other examples, the seat 110 is secured to both the floor 130 and a wall 135 of the vehicle 100, via the fasteners 132 and one or more fasteners 137, to save space within the vehicle 100. For example, the seat 110 mounts to a ledge 140 of the wall 135. In other embodiments, the seat 110 mounts to the floor 130 and not the wall 135. In yet another embodiment, the seat 110 mounts to the walls 135 and not the floor 130.

Figure 2:
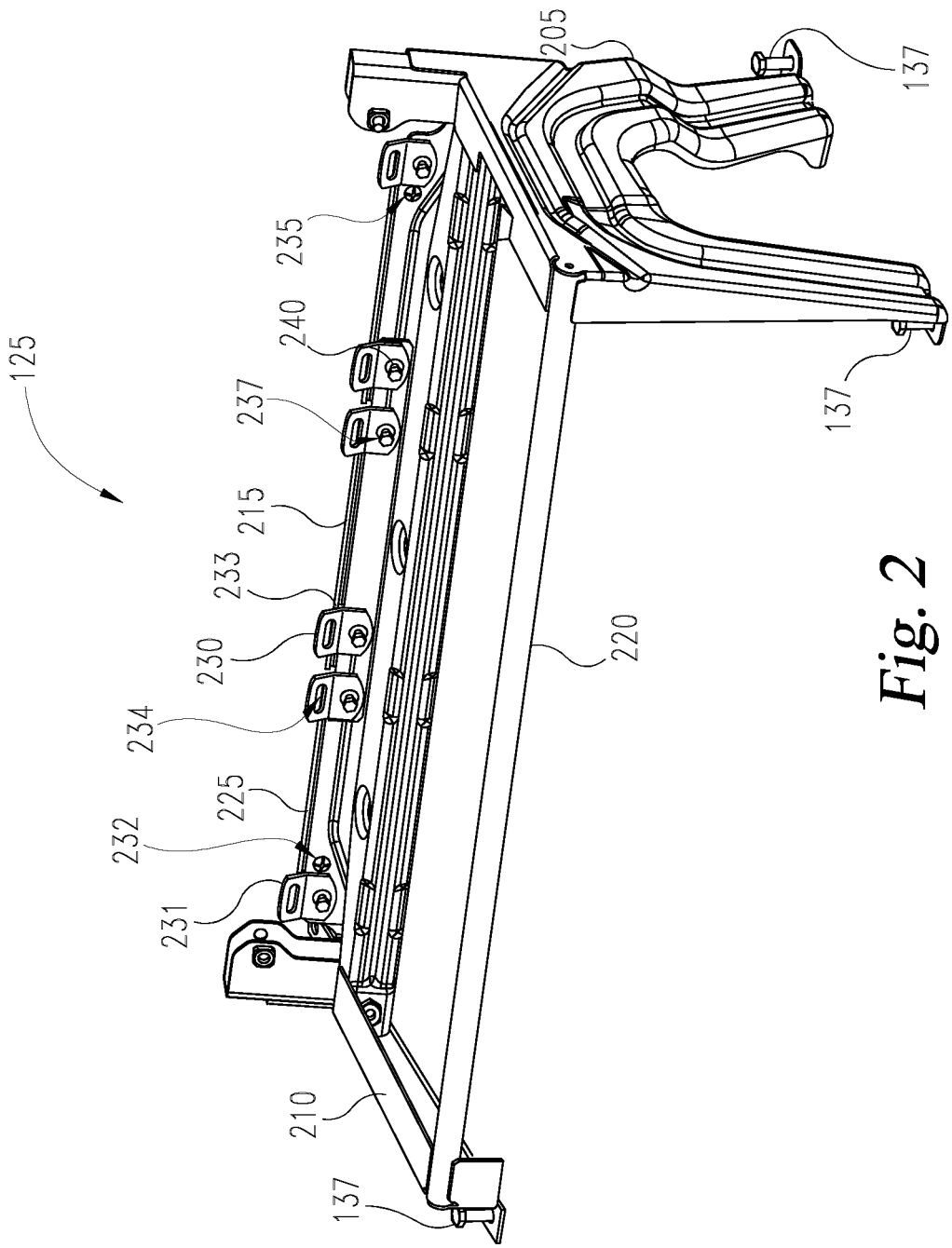
FIG. 2 is a perspective view of a frame of the seating system of FIG. 1.

As illustrated in FIG. 2, the frame 125 of the seat 110 includes a pedestal 205. The pedestal 205 is configured to secure the seat 110 to the floor 130 of the vehicle 100. The frame 125 further includes a mounting bracket 210 located at an opposite end of the frame 125 from the pedestal 205. The mounting bracket 210 is configured to secure the frame 125 to the wall 135 of the vehicle 100 via the fasteners 132. Between the pedestal 205 and the mounting bracket 210 is a cross member 215. The cross member 215 is configured to support the seat back 115 and seat bottom 120 of the seat 110. In one example, the cross member 215 is located where the seat back 115 and seat bottom 120 meet. Opposite the cross member 215 is a cross beam 220. The cross beam 220 supplies structural strength and rigidity to the frame 125, such as to mitigate bending and/or flexion during a collision. In one example, the cross beam 220 extends from the pedestal 205 to the mounting bracket 210 at an area where the seat bottom 120 ends.

In one embodiment, the cross member 215 includes a seat back flange 225 configured to support the seat back 115. For example, the seat back 115 rests against the seat back flange 225 when installed, such that the seat back flange 225 prevents rotation of the seat back 115. In one example, the cross member 215 further includes one or more belt anchors 230. The belt anchors 230 are configured to support belted configurations of the seat. In one example, the belt anchors 230 include a belt retention portion 231 and a mounting portion 232. The belt retention portion 231 extends away from the seat back flange 225 of the cross member 215 via a bend 233 between the belt retention portion 231 and the mounting portion 232. The belt retention portion 231 and mounting portion 232 in the depicted example are bent at an oblique angle relative to one another. The belt anchors 230 in one version have a generally rectangular shape with rounded corners, and the belt anchors 230 are made from stamping metal sheets such as those made from steel. In one example, the belt retention portion 231 includes a retention loop 234 configured to retain and secure a seat belt. For example, the seat belt is threaded through the retention loop 234, such that the belt anchor 230 retains the seat belt. The retention loop 234 in the illustrated example has an oblong shape with rounded ends so as to reduce wear of the seat belt. As shown, the mounting portion 232 of the belt anchor 230 includes an aperture 237 configured to align with one or more holes 235 of the seat back flange 225 to facilitate installation and/or mounting of the belt anchors 230 to the seat back flange 225. The aperture 237 in one form has a circular or cylindrical shape. In one embodiment, the belt anchors 230 are removably secured to the seat back flange 225 via one or more fasteners 240, such as screws and/or bolts secured within and/or through the holes 235 and the apertures 237. Thus, the seat 110 can be modified from a belted to an unbelted configuration without significant changes to the frame 125. For example, removal of the belt anchors 230 from the cross member 215 transforms the seat 110 from a belted to an unbelted configuration.

Figure 3:
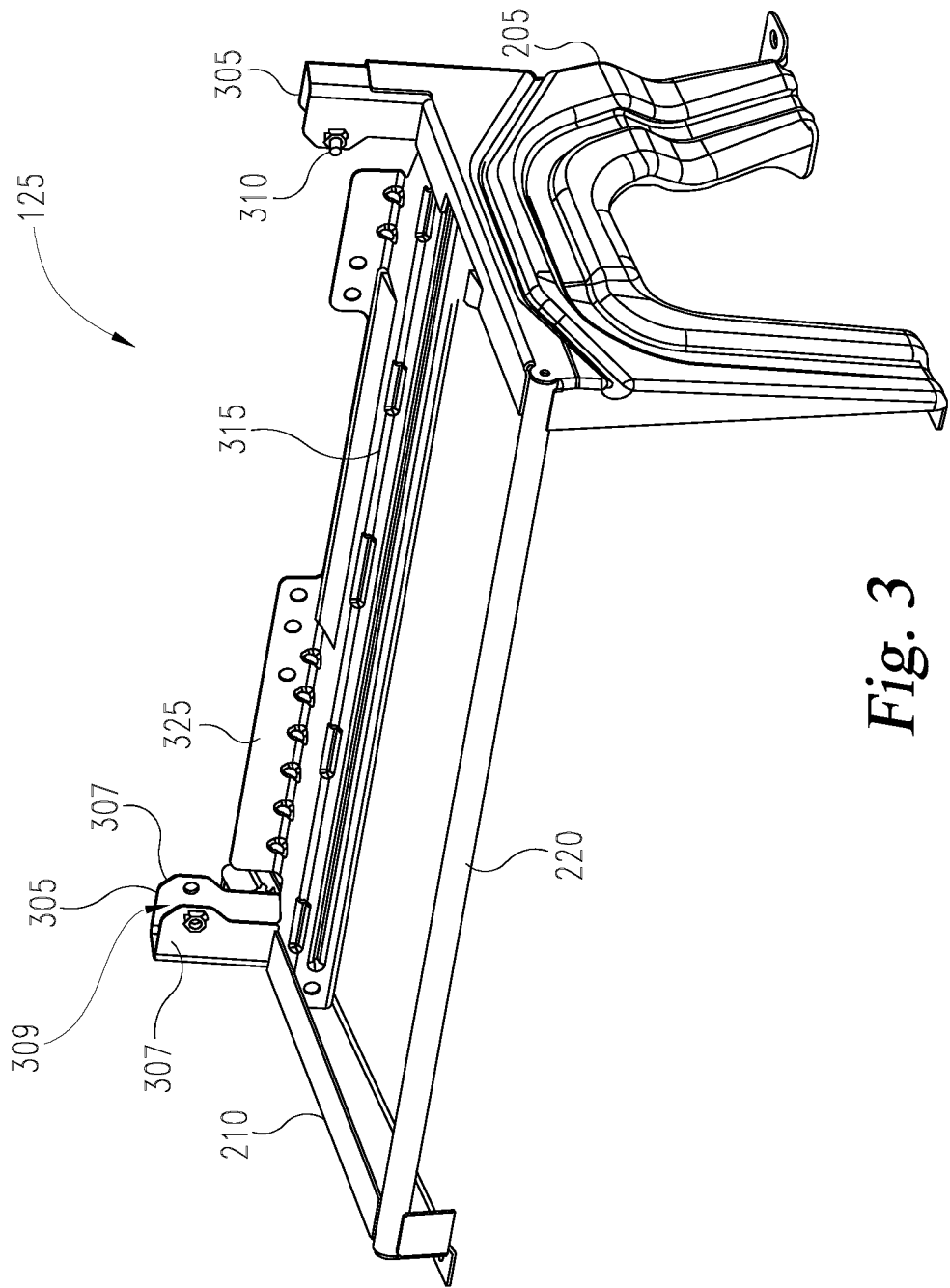
FIG. 3 is a perspective view of the frame of FIG. 2 without one or more belt anchors.

FIG. 3 shows an example of the frame 125 without the belt anchors 230. The frame 125 includes a receptacle 305 configured to secure the seat back 115 in a sandwich configuration via one or more fasteners 310. For example, the receptacle 305 includes one or more tabs 311 defining a channel 313 configured to receive and secure the seat back 115 via the fasteners 310. The frame 125 further includes a cross member 315. The cross member 315 is configured for unbelted configurations. The cross member 315 includes a seat back flange 325 without the belt anchors (shown in FIG. 2). As should be appreciated, the cross member 315 transitions into the cross member 215 discussed previously via attachment of one or more belt anchors 230. As should be appreciated, this configuration enables the modification from a belted to an unbelted configuration without significant changes to the frame 125. For example, the addition of the belt anchors 230 via the fasteners 240 transitions the cross member 315 into the cross member 215.

Figure 4:
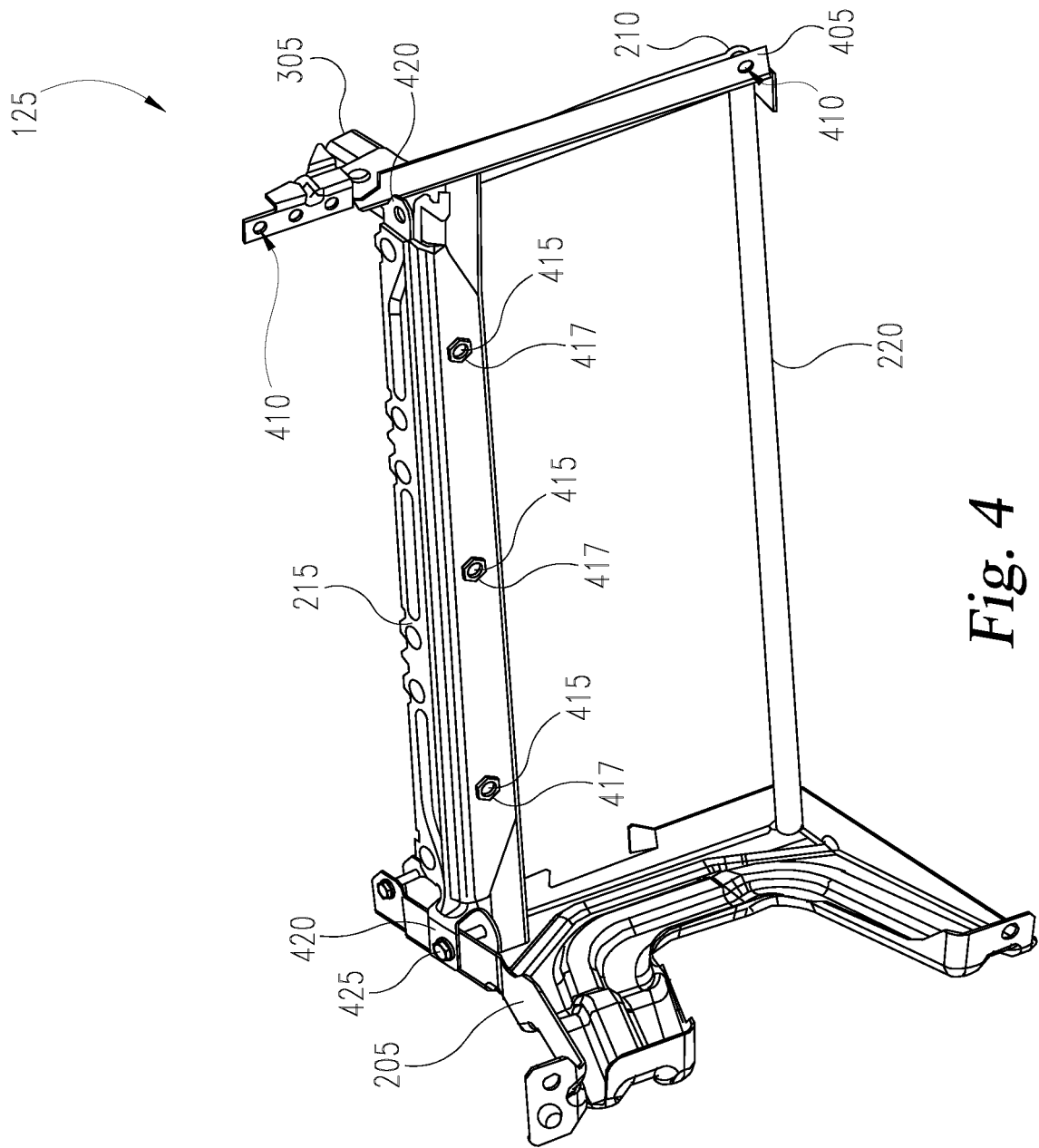
FIG. 4 is a bottom perspective view of the frame of FIG. 2.

Turning to FIG. 4, the frame 125 includes a mounting flange 405 extending from the mounting bracket 210. The mounting flange 405 includes one or more apertures 410 configured to enable a user to secure the seat 110 to the wall 135 via the fasteners 132. The apertures 410 further enable the mounting flange 405 to mount to any vertical surface via the fasteners 132. The frame 125 further includes one or more rivets 415 configured to secure components of the cross member 215 together. In one example, the rivets 415 are oriented with a mandrel 417 of the rivets 415 facing away from passengers. As should be appreciated, this configuration faces sharp components of the rivets 415, such as the mandrel 417 away from a passenger. Thus, safety and comfort of the passenger is increased. In some examples, the cross member 215 includes one or more arms 420 configured to mount the cross member 215 to the pedestal 205 and mounting bracket 210 via one or more fasteners 425.

Figure 5:
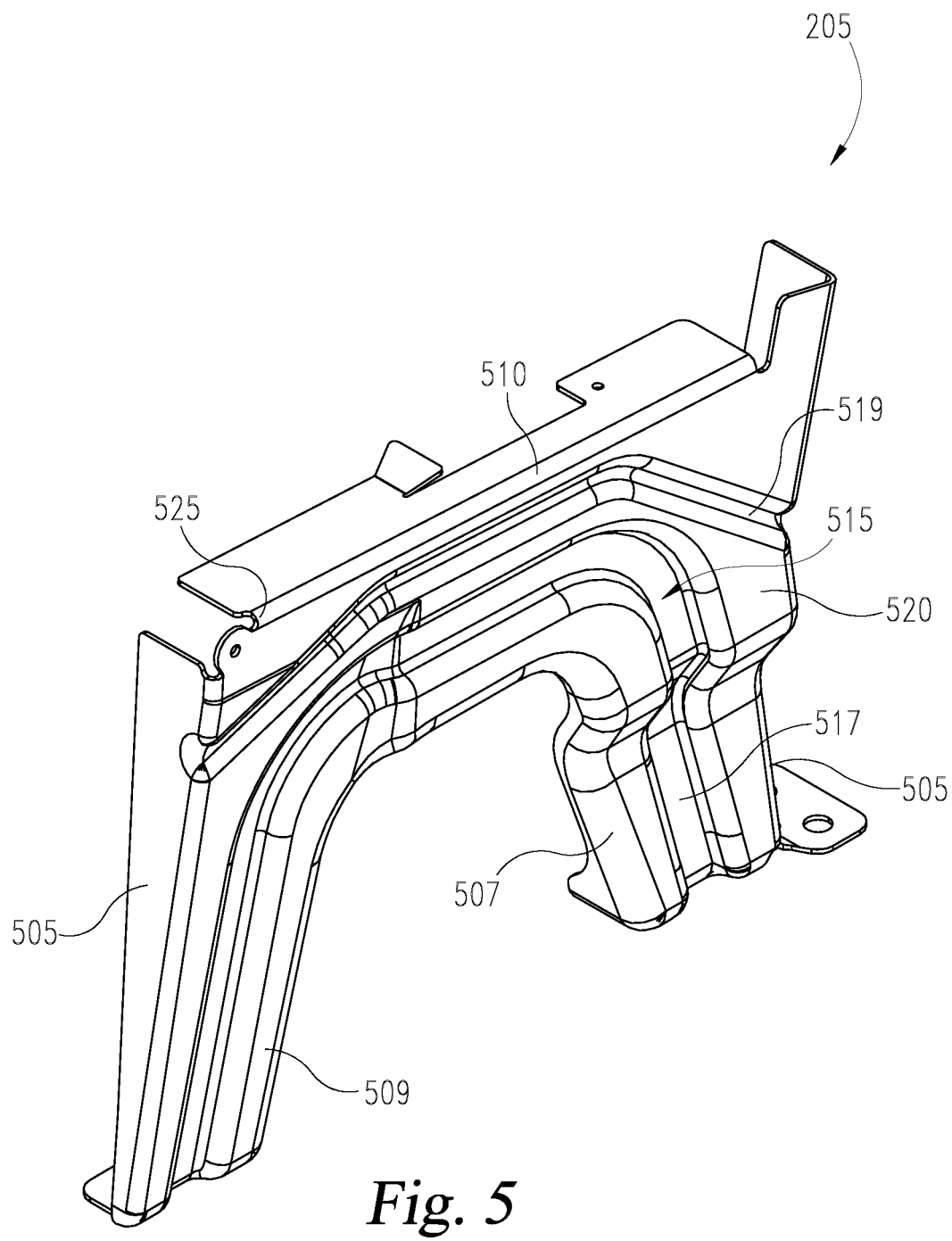
FIG. 5 is a perspective view of a pedestal of the frame of FIG. 2.

As illustrated in FIG. 5, the pedestal 205 includes one or more legs 505. For example, the pedestal 205 includes a pair of legs 505, such as a first leg 507 and a second leg 509 connected via an arch 510. In the illustrated example, the pedestal 205 forms an upside down "U" shape. In one variation, the pedestal 205 is made from metal and/or a metallic material. However, in other variations, the pedestal 205 is made from plastic, carbon fiber, and/or other polymeric materials. In some examples, the pedestal 205 is designed with one or more integral crumple zones 515, such as a first crumple zone 517 and a second crumple zone 519. The crumple zones 515 are configured to assist in force management during a collision. For example, the crumple zones 515 are configured to deform during a crash so as to dissipate energy from the crash with minimal damage to other components of the frame 125. In one example, the crumple zones 515 define an inset and/or recessed shape, such that the crumple zones 515 form a channel and/or path within a face 520 of the pedestal 205. The first crumple zone 517 extends without interruption (e.g., unbroken) throughout the first leg 507, second leg 509, and arch 510. The second crumple zone 519 is situated within the arch 510, between the first crumple zone 517 and a crease 525 of the pedestal 205.

Figure 6:
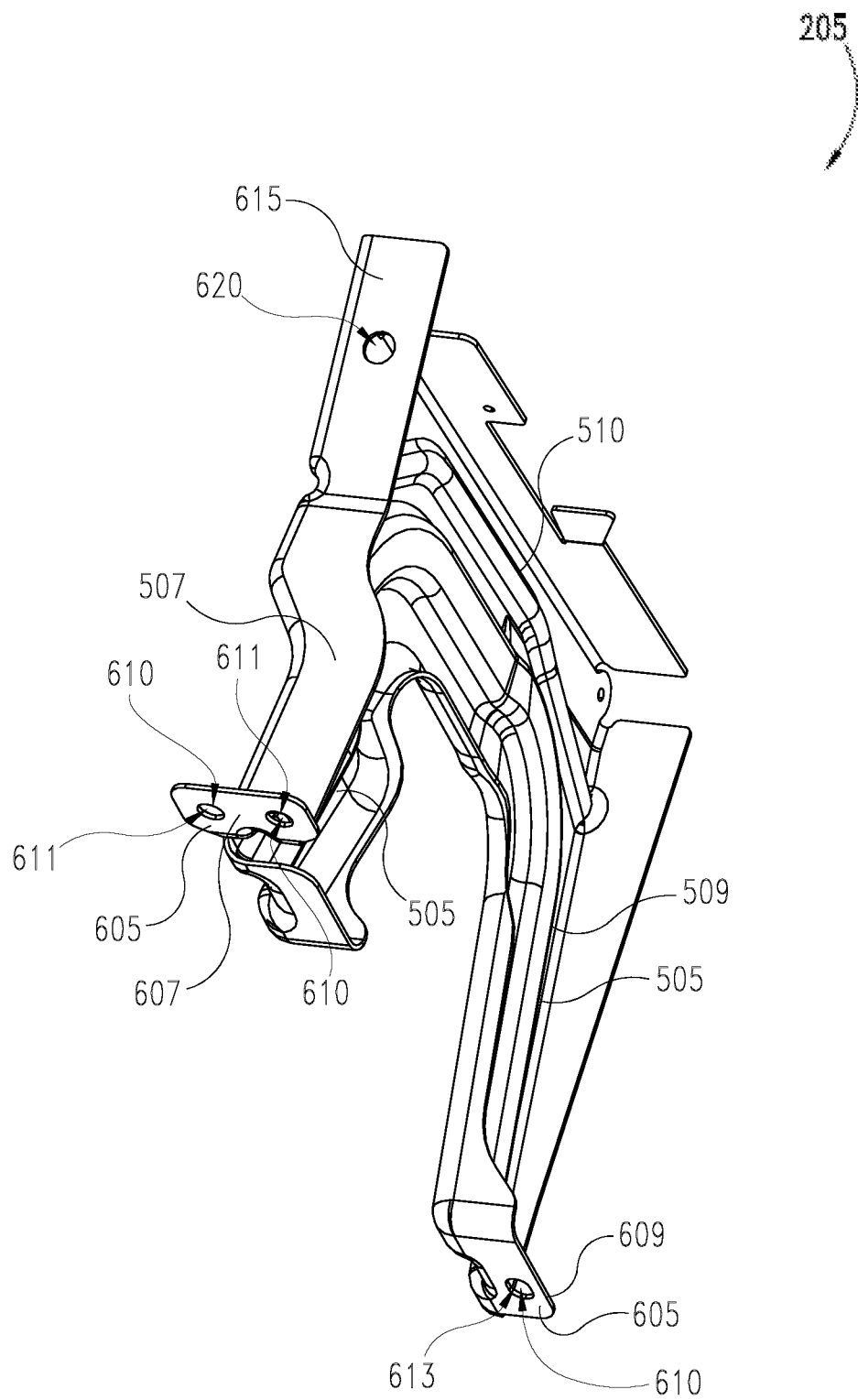
FIG. 6 is a bottom perspective view of the pedestal of FIG. 5.

FIG. 6 shows one or more feet 605 of the pedestal 205. In the depicted example, the pedestal 205 includes a pair of feet 605, such as a first foot 607 and a second foot 609. The feet 605 are positioned adjacent the floor 130 of the vehicle 100 during the installation of the seat 110. For example, the feet 605 rest on top of the floor 130 of the vehicle 100. The feet 605 define one or more mounting holes 610. For instance, the first foot 607 includes a pair of mounting holes 611 and the second foot 609 includes a single mounting hole 613. The mounting holes 610 are configured to receive the fasteners 137 to mount the pedestal 205 to the floor 130 of the vehicle 100. In one embodiment, the pedestal 205 is configured to mount to the floor 130 of the vehicle 100 without the use of stiffening plates. For example, the feet 605 are self-reinforced such that the feet 605 provide the required stiffness without the need for additional stiffening plates. In one example, the feet 605 are made from folded metal and/or a metallic material to create a double thickness portion adjacent to the mounting holes 610. As should be appreciated, holes and/or voids tend to weaken structures, thus increasing the thickness of the feet 605 adjacent the mounting holes 610 increases the overall strength of the pedestal 205.

The pedestal 205 further includes a mounting plate 615. The mounting plate 615 enables the cross member 215 to mount to the pedestal 205. For example, the mounting plate 615 includes an aperture 620. The aperture 620 aligns with the fastener 425 described previously. Thus, when the arms 420 are positioned adjacent the mounting plate 615, the fastener 425 slides through the aperture 620 and secures the cross member 215 to the pedestal 205.

Figure 7:
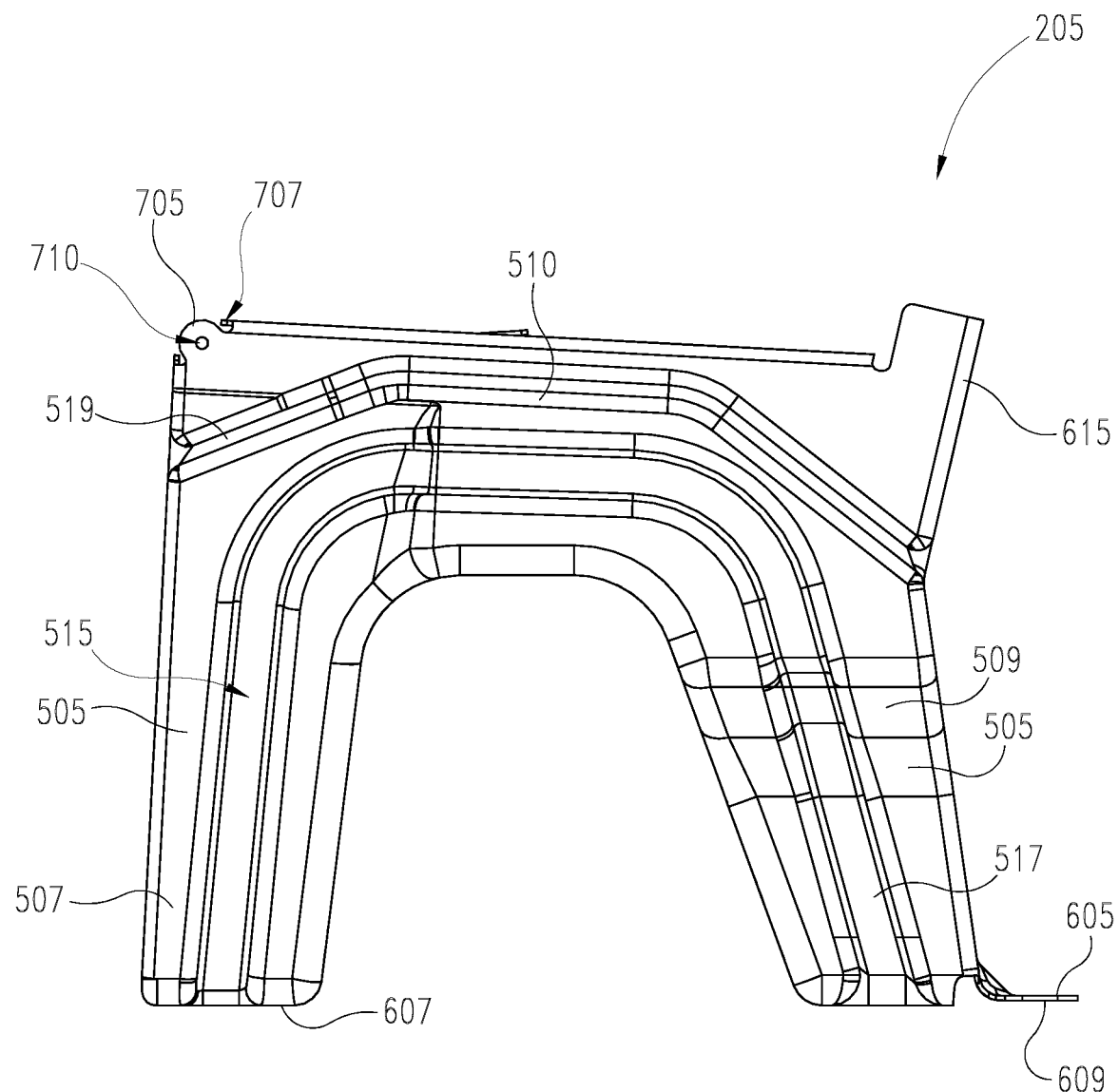
FIG. 7 is a first side view of the pedestal of FIG. 5.
Figure 8:
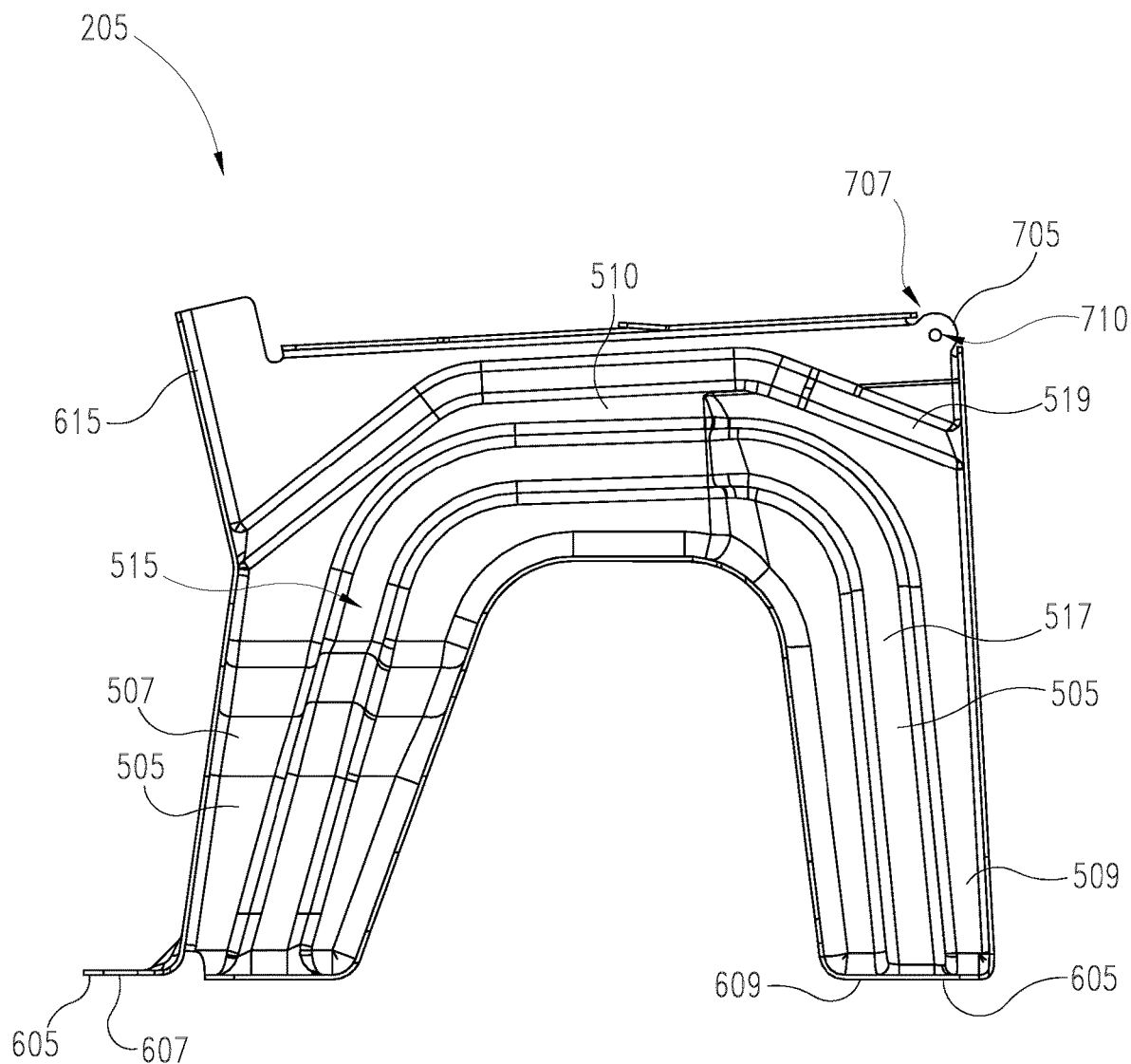
FIG. 8 is a second side view of the pedestal of FIG. 5.

FIGS. 7 and 8 illustrate interior and exterior views of the pedestal 205 including a protrusion 705 extending from a corner 707 of the pedestal 205. The protrusion 705 includes a fastener 710 configured to secure the cross beam 220 between the pedestal 205 and the mounting bracket 210. As mentioned previously, the protrusion 705 is positioned adjacent a termination point of the seat bottom 120.

Figure 9:
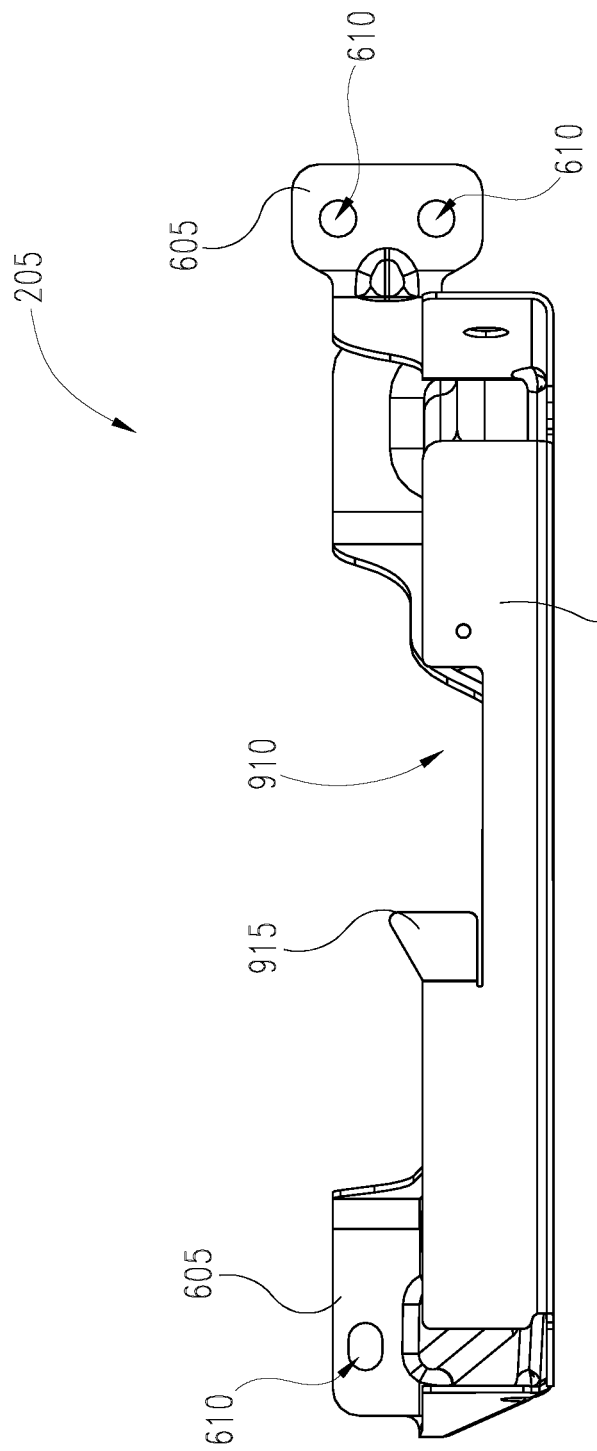
FIG. 9 is a top view of the pedestal of FIG. 5.

As shown in FIG. 9, the pedestal 205 includes a seat rail 905. The seat rail 905 serves as a resting and/or mounting location for the seat bottom 120. In one example, in addition to and/or instead of fasteners, the pedestal 205 includes a cutout 910 and a tab 915. The cutout 910 and tab 915 are configured to secure the seat bottom 120 to the pedestal 205. For example, the tab 915 engages the seat bottom 120 via an interference and/or friction fit to removably secure the seat bottom 120 on the seat rail 905 of the pedestal 205.

Figure 10:
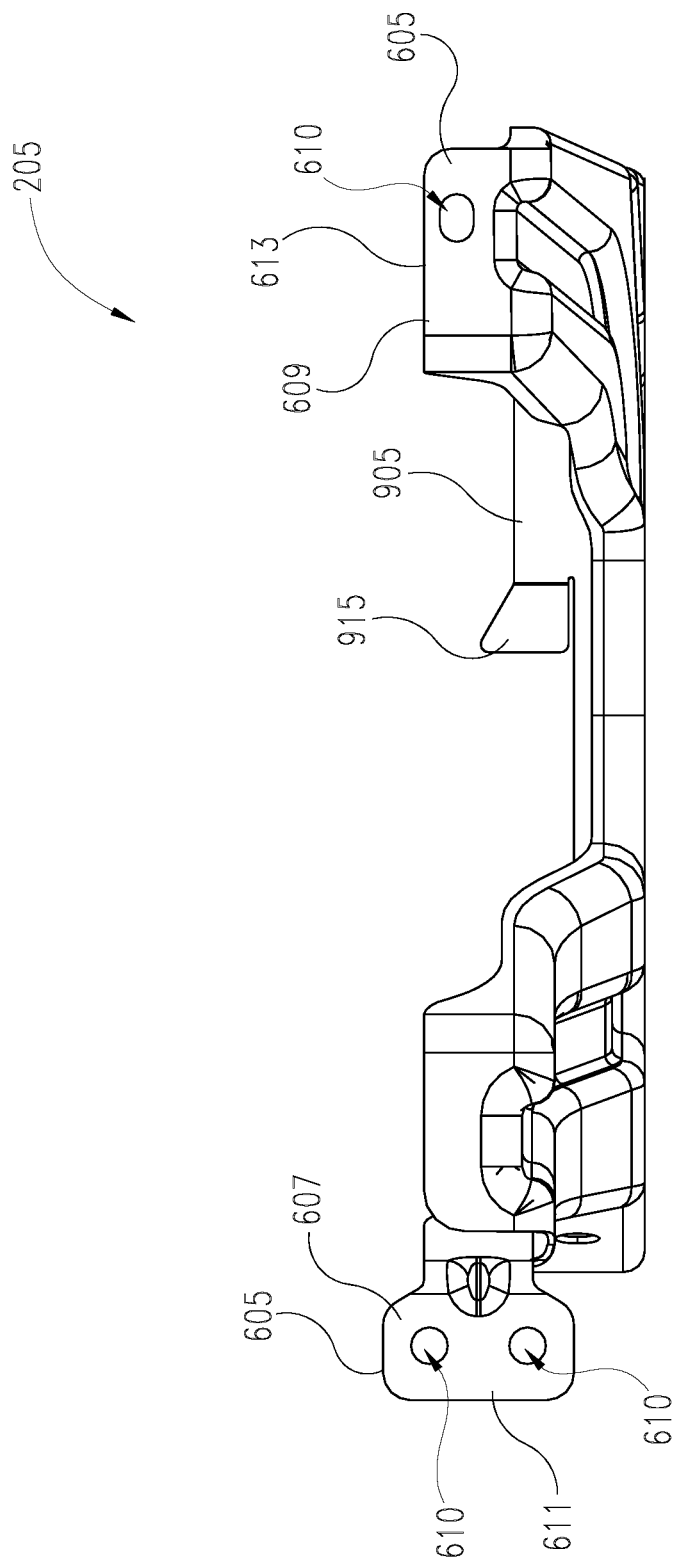
FIG. 10 is a bottom view of the pedestal of FIG. 5.

Illustrated in FIG. 10, the pedestal 205 includes a pair of feet 605 including the first foot 607 and the second foot 609. The first foot 607 and the second foot 609 form two (2) points of contact with the floor 130 of the vehicle 100. In other examples, the pedestal 205 includes other numbers of feet 605, such as one (1), three (3), four (4), and/or more feet 605 corresponding to more and/or less points of contact with the floor 130. As mentioned previously, the feet 605 are self-reinforced to facilitate direct mounting of the pedestal 205 to the floor 130, without the need for additional stiffening plates.

Figure 11:
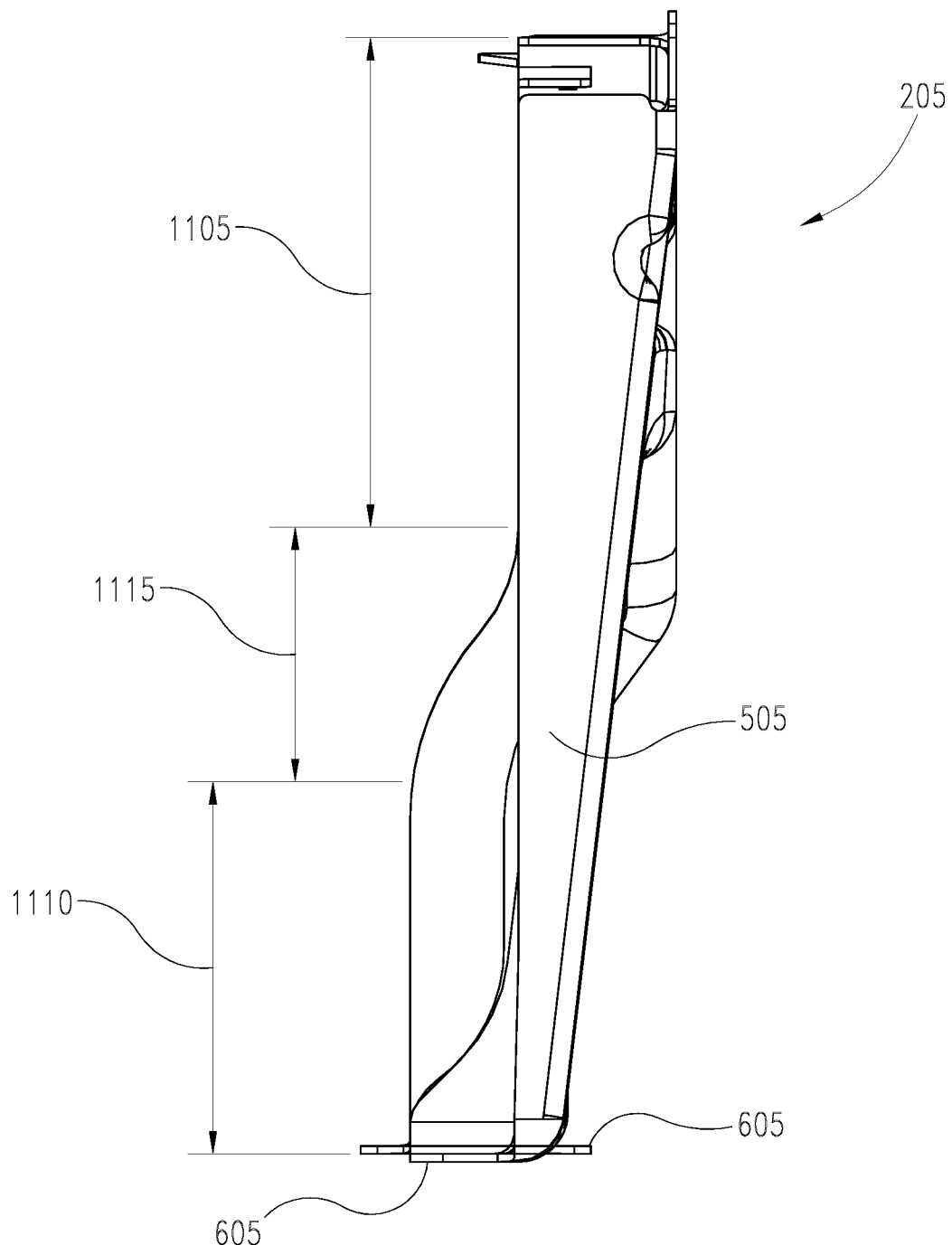
FIG. 11 is a front view of the pedestal of FIG. 5.
Figure 12:
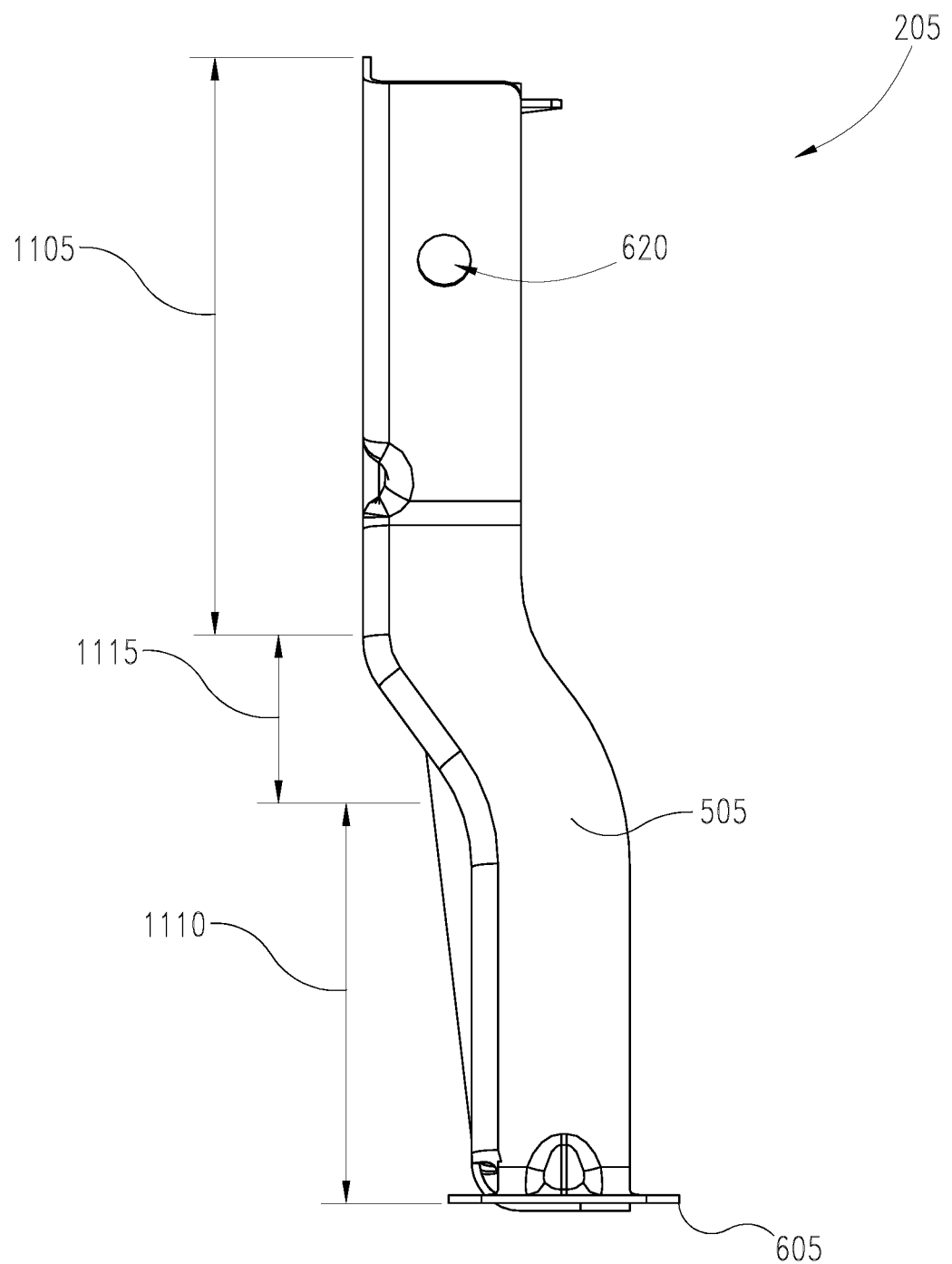
FIG. 12 is a rear view of the pedestal of FIG. 5.

As shown in FIGS. 11 and 12 the pedestal 205 is approximately Z-shaped. For example, the pedestal 205 includes a first vertical portion 1105, located near the seat bottom 120, and a second vertical portion 1110, located near the floor 130. Between the first vertical portion 1105 and the second vertical portion 1110 is a curved portion 1115 configured to offset the second vertical portion 1110 from the first vertical portion 1105. In another example, the pedestal 205 is a straight, curved, and/or other shape. The "Z" shape of the pedestal 205 enables improved force transmission in the event of a collision. In another example, the "Z" shape of the pedestal 205 mitigates the risk of accidental injury to a passenger via a stubbed foot and/or toe. For example, the offset and/or recessed second vertical portion 1110 is oriented such that the second vertical portion 1110 does not stick out and/or protrude into a walking path and/or aisle of the vehicle 100.

Figure 13:
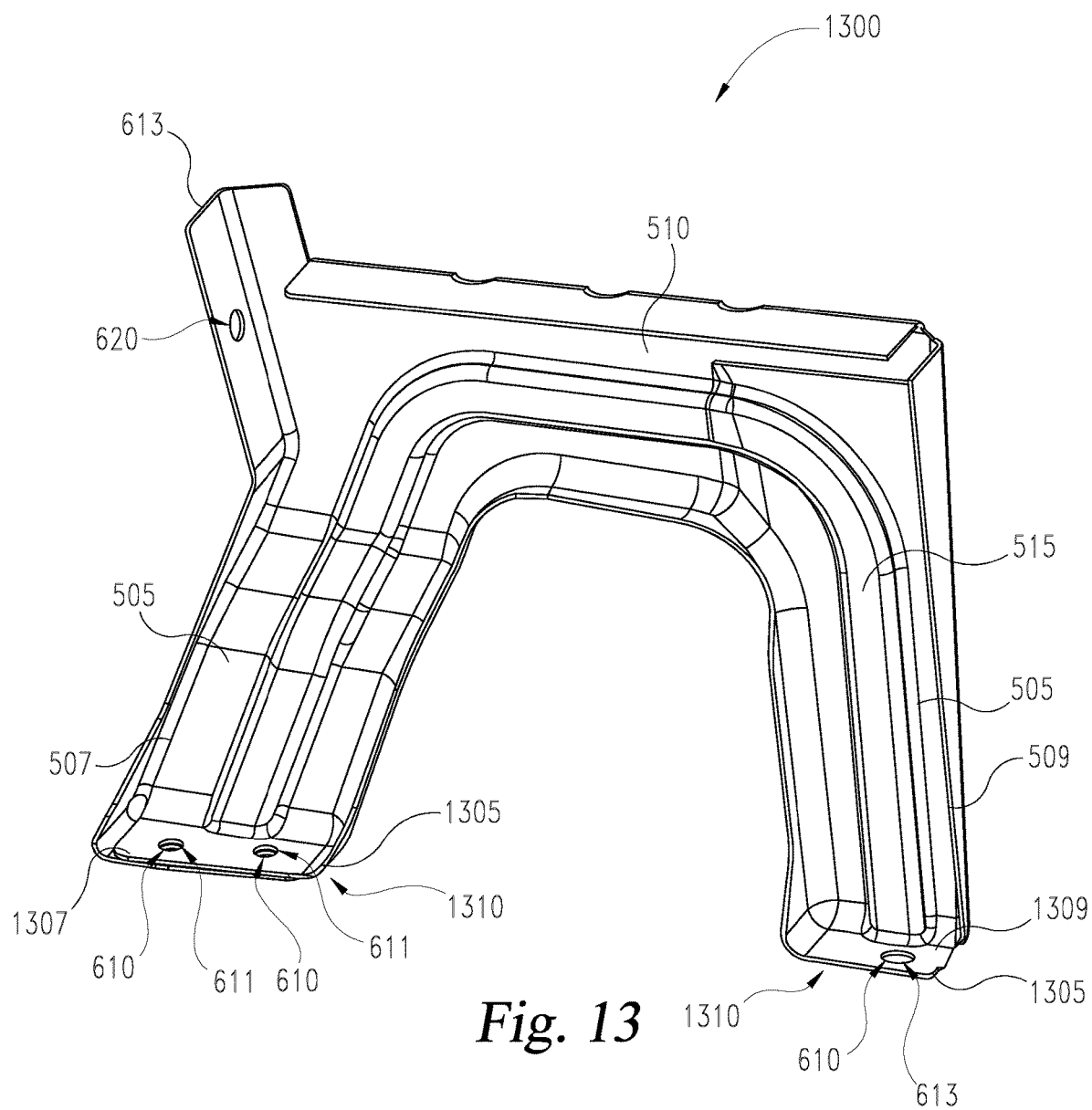
FIG. 13 is a perspective view of another embodiment of the pedestal.

FIG. 13 shows another example of a pedestal 1300 that can be used in the seating system 105 of FIG. 1. The pedestal 1300 shares a number of components and functions in common with the ones described before (see e.g., FIGS. 1-12). For the sake of brevity as well as clarity, these common features will not be described in great detail below, but please refer to the previous discussion. As depicted, the pedestal 1300 includes one or more feet 1305. such as a first foot 1307 and a second foot 1309, with a double thickness portion 1310. In one example, the double thickness portion 1310 includes one or more layers of metal and/or a metallic material to increase strength and stiffness of the feet 1305.

Figure 14:
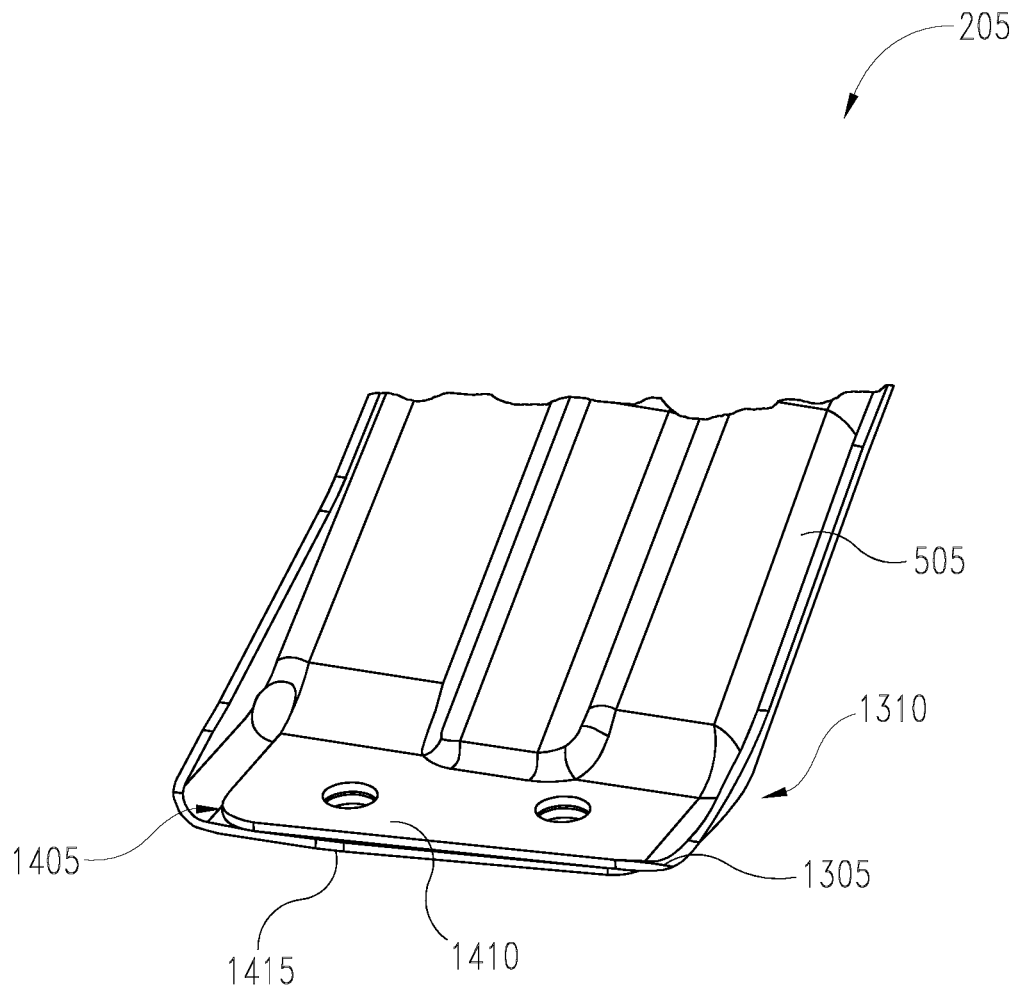
FIG. 14 is an enlarged perspective view of a portion of the pedestal of FIG. 13.

As illustrated in FIG. 14, the feet 1305 include a reinforced portion 1405. In one example, the reinforced portion 1405 is formed via folded metal, such as steel, stainless steel, iron, aluminum, and/or other metallic materials. In one example, the folded metal defines the double thickness portion 1310 with a first layer 1410 and a second layer 1415. The mounting holes 610 extend through both the first layer 1410 and second layer 1415 to enable direct mounting of the pedestal 205 to the floor 130 without need for additional stiffening plates. As should be appreciated, the reinforced portion 1405 provides added security and/or safety within the vehicle 100. For example, in the event of a collision, the reinforced portion 1405 is configured to maintain the position of the seat 110 within the vehicle 100.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Channel" generally refers to a long, narrow groove in a surface of an object.

"Couple" or "Coupled" generally refers to an indirect and/or direct connection between the identified elements, components, and/or objects. Often the manner of the coupling will be related specifically to the manner in which the two coupled elements interact.

"Crumple Zone" generally refers to a structural component of a product designed to increase the time over which a change in velocity occurs as a result of an impact and/or force. In one example, crumple zones are configured to deform in a predetermined manner to control and/or absorb a portion of the applied force, thus reducing the impact felt by passengers. In another example, crumple zones are configured to deform in a particular location in order to re-direct force from an impact.

"Direct" or "Directly Mounted" generally refers to a mounting configuration in which a first item is mounted to a second item without any intermediaries between the items. For example, a wooden block screwed onto a wall, without anything between the wall and the block, is directly mounted to the wall. Put differently, an item is directly mounted to another item if there are no other objects between the items.

"Face" generally refers to a surface that forms part of the boundary of a solid object. A face can be a flat surface on a three-dimensional object. A face may also refer to a non-flat surface that includes curves.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Flat" generally refers to an object having a broad level surface but with little height.

"Floor" generally refers to the flat base panel of a vehicle where the support structures are mounted. The floor can be made of many different materials such as wood, plastics, metals, rubbers, or a combination of materials. The floor may have tracks or mounting brackets for mounting support structures that are flush with the rest of the floor and/or protrude above the standard floor height. The floor of a vehicle is also the primary area for storage as that is where the items are set. For example, when loading the back of a van, the groceries are typically set on the floor. Additionally, the floor may be covered in a material to make it more comfortable. Some materials used may be carpet, rubber, metals, or leathers.

"Fold" generally refers to the act or bending an object over itself, such that one portion of an object covers another portion of the same object. In one example, folding an object doubles the thickness of the object with each successive fold. For example, with a single layer object, the first fold creates a double and/or two (2) layer object. The next fold creates a four (4) layer object. Another fold creates an eight (8) layer object and so on. As should be appreciated, the process of folding an object increases the thickness of the object. As a result of the increased thickness, structural strength of the object is increased.

"Foot" generally refers to a structure upon which a support structure, like a seat, rests against a floor or ground.

"Frame" generally refers to a structure that forms part of an object and gives strength and/or shape to the object.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Lateral" generally refers to being situated on, directed toward, or coming from the side.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Optionally" means discretionary; not required; possible, but not compulsory; left to personal choice.

"Parallel" generally refers to coplanar straight lines in two-dimensional space or planes in the same three-dimensional space that never intersect and/or otherwise never meet.

"Rivet" generally refers to a permanent and/or semi-permanent mechanical fastener. Rivets typically include a smooth cylindrical shaft and/or mandrel extending into a flat and/or dome shaped head. In some examples, the rivet includes a head at one end of the shaft and/or mandrel and a tail at an opposing end. Rivets are generally deformed during the fastening process, such that the tail and/or mandrel expands circumferentially. Thus, an installed rivet typically defines a somewhat dumbbell shape. Some types of rivets include: solid rivets, structural rivets, semi-tubular rivets, blind rivets, Oscar rivets, drive rivets, flush rivets, friction-lock rivets, self-piercing rivets, and/or compression rivets.

"Seat" generally refers to a type of support structure or a place constructed for the purpose of allowing a human and/or other animal to sit. Some examples of seats include chairs, stools, benches, saddles, and sofas to name just a few. Typically, but not always, the seat can further include a backrest, armrest, and a headrest as well as other features.

"Seat Belt", "Safety Belt", "Vehicle Belt", or "Belt" generally refers to an arrangement of webs, straps, and other devices designed to restrain or otherwise hold a person or other object steady such as in a boat, vehicle, aircraft, and/or spacecraft. For example, the seat belt is designed to secure an occupant of a vehicle against harmful movement that may result during a collision or a sudden stop. By way of non-limiting examples, the seat belt can include webbing, buckles, latch plates, and/or length-adjustment mechanisms, such as a retractor, installed in the vehicle that is used to restrain an occupant or a child restraint system. The seat belt for instance can include a lap belt only, a combination lap-shoulder belt, a separate lap belt, a separate shoulder belt, and/or a knee bolster.

"Self-reinforced" generally refers to a strengthening and/or support method done without the use of outside components. For example, an object with an increased thickness portion adjacent a failure point is self-reinforced adjacent the failure point. In another example, self-reinforcement techniques include increasing the thickness of the material, modifying the shape of the material, and/or other methods of increasing the structural strength of the material without the addition of outside components (e.g., braces and/or brackets). In one example, a self-reinforced area is structurally enhanced and/or stronger than surrounding areas of the object.

"Tab" generally refers to a projection, flap, or strip of material that extends from an object or structure.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Unitary" generally refers to a single, continuous entity formed without multiple pieces.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Wall" generally refers to a side of a room, building, vehicle, and/or compartment that extends from a floor or foundation to a ceiling or roof. The wall in one form may have a planar or multiplanar shape. The wall may be constructed from any of a variety of materials, including, but not limited to metal, concrete, wood, or plastic.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 vehicle 135 wall
105 seating system 137 fasteners
110 seat 140 ledge
115 seat back 205 pedestal
120 seat bottom 210 mounting bracket
125 frame 215 cross member
130 floor 220 cross beam
132 fasteners 225 seat back flange
230 belt anchors 520 face
231 belt retention portion 525 crease
232 mounting portion 605 feet
233 bend 607 first foot
234 retention loop 609 second foot
235 holes 610 mounting holes
237 aperture 611 mounting holes
240 fasteners 613 mounting hole
305 receptacle 615 mounting plate
310 fasteners 620 apertures
311 tabs 705 protrusion
313 channel 707 corner
315 cross member 710 fasteners
325 seat back flange 905 seat rail
405 mounting flange 910 cutout
410 apertures 915 tab
415 rivets 1105 first vertical portion
417 mandrel 1110 second vertical portion
420 arms 1115 curved portion
425 fasteners 1300 pedestal
505 legs 1305 feet
507 first leg 1307 first foot
509 second leg 1309 second foot
510 arch 1310 double thickness portion
515 crumple zones 1405 reinforced portion
517 first crumple zone 1410 first layer
519 second crumple zone 1415 second layer

What is claimed is:
1. A system, comprising:
a vehicle seat frame;
wherein the vehicle seat frame includes a pedestal;
wherein the pedestal includes a leg;
wherein the pedestal has a foot extending transverse to the leg;
wherein the foot is positioned to contact a floor of a vehicle when a pedestal is mounted to the floor;
wherein the foot is self-reinforced to facilitate direct mounting of the pedestal to the floor;
wherein the foot is directly mounted to the floor without an additional plate to increase joint stiffness;
wherein the foot includes a reinforced portion;
wherein the reinforced portion includes a folded metal sheet that includes a first layer and a second layer;
wherein the first layer and the second layer define a mounting hole; and
wherein the mounting hole is configured to receive a fastener that secures the foot to the floor.

2. The system of claim 1, wherein the pedestal includes one or more crumple zones to dissipate energy during a crash.

3. The system of claim 1, wherein the vehicle seat frame includes a wall mount configured to secure to a vehicle wall.

4. The system of claim 3, wherein
the wall mount has two or more different vehicle mounting configurations; and
the wall mount has two or more mounting holes for securing the wall mount at the different mounting configurations.

5. The system of claim 1, wherein the vehicle seat frame includes a cross member.

6. The system of claim 5, wherein the cross member is configured to support both unbelted and belted type seats.

7. The system of claim 6, wherein
the cross member has one or more belt anchors where one or more seat belts are anchored; and
the belt anchors mount to the cross member via fasteners arranged through one or more holes defined in a seat back flange extending from the cross member.

8. The system of claim 5, wherein the cross member is made of roll formed ultra-high strength steel.

9. The system of claim 5, wherein
the cross member includes one or more rivets; and
a mandrel of the rivets is oriented to face away from a seat occupant.

10. The system of claim 1, wherein
the vehicle seat frame is configured to support a bench type seat; and
the bench type seat is a bus seat.

11. A system, comprising:
a vehicle seat frame;
wherein the vehicle seat frame includes a pedestal;
wherein the pedestal includes a first leg, a second leg, and an arch connecting the first leg to the second leg;
wherein the first leg, the second leg, and the arch form an upside-down U shape;
wherein the first leg and the second leg each include a foot;
wherein the foot is positioned to contact a floor of a vehicle when a pedestal is mounted to the floor;
wherein the foot is self-reinforced to facilitate direct mounting of the pedestal to the floor;
wherein the pedestal includes one or more crumple zones to dissipate energy during a crash;
wherein the pedestal has a face;
wherein the crumple zones each form a channel in the face of the pedestal; and
wherein the channel extends in an unbroken manner from the first leg to the second leg across the arch.

12. The system of claim 11, wherein:
the foot includes a reinforced portion;
the reinforced portion includes a folded metal sheet that includes a first layer and a second layer;
the first layer and the second layer define a mounting hole;
the mounting hole is configured to receive a fastener that secures the foot to the floor;
the crumple zones include a first crumple zone and a second crumple zone;
the first crumple zone extends in an unbroken manner from the first leg to the second leg across the arch; and
the second crumple zone is situated in the arch.

13. The system of claim 12, wherein:
the vehicle seat frame includes a wall mount configured to secure to a wall of the vehicle;

the wall mount includes a mounting bracket and a mounting flange extending from the mounting bracket; and the mounting flange defines one or more apertures configured to receive one or more fasteners to secure to the wall of the vehicle.

14. The system of claim 11, further comprising:

wherein the vehicle seat frame includes a cross member;

wherein the cross member is configured to support both unbelted and belted type seats;

wherein the cross member has a seat back flange extending from the cross member to support a seat back;

wherein the seat back flange defines one or more holes;

wherein the cross member has one or more belt anchors removably secured at the holes of the seat back flange;

wherein the belt anchors each include a belt retention portion and a amounting portion;

wherein the belt retention portion extends at an oblique angle from the mounting portion;

wherein the belt retention portion has a retention loop configured to retain a seat belt;

wherein the mounting portion defines an aperture; and a fastener extending through the aperture in the mounting portion and one of the holes in the seat back flange to removably secure one of the belt anchors to the seat back flange.

15. The system of claim 14, wherein the cross member is made of roll formed ultra-high strength steel.

16. The system of claim 14, wherein:

the cross member includes one or more rivets; and a mandrel of the rivets is oriented to face away from a seat occupant.

17. The system of claim 11, wherein:

the vehicle seat frame is configured to support a bench type seat; and the bench type seat is a bus seat.

* * * * *

UNITED STATES PATENT AND TRADEMARK OFFICE
CERTIFICATE OF CORRECTION

PATENT NO. : 12,377,757 B2
APPLICATION NO. : 17/934383
DATED : August 5, 2025
INVENTOR(S) : Srinivasan et al.

Page 1 of 1

It is certified that error appears in the above-identified patent and that said Letters Patent is hereby corrected as shown below:

In the Claims

Column 11, Claim 1, Line 63, replace "sheet that includes a first layer and a second laver;" with --sheet that includes a first layer and a second layer;--

Signed and Sealed this
Sixteenth Day of September, 2025

Coke Morgan Stewart
*Acting Director of the United States Patent and Trademark Office*